US012766059B2

(12) United States Patent
Owen

(10) Patent No.: US 12,766,059 B2
(45) Date of Patent: Oct. 20, 2026

(54) CONNECTION POINT ASSEMBLY FOR A PATIENT LIFTER SPREADER BAR WITH A VISUAL INDICATOR INDICATIVE OF A LATCH POSITION THEREOF

(71) Applicant: Aidacare Pty Ltd, Moorebank (AU)

(72) Inventor: David Owen, Sandringham (AU)

(73) Assignee: AIDACARE PTY LTD, Moorebank (AU)

( * ) Notice: Subject to any disclaimer, the term of this patent is extended or adjusted under 35 U.S.C. 154(b) by 848 days.

(21) Appl. No.: 17/756,845

(22) PCT Filed: Dec. 3, 2020

(86) PCT No.: PCT/AU2020/051314
§ 371 (c)(1),
(2) Date: Jun. 3, 2022

(87) PCT Pub. No.: WO2021/108856
PCT Pub. Date: Jun. 10, 2021

(65) Prior Publication Data

US 2023/0000705 A1 Jan. 5, 2023

(30) Foreign Application Priority Data

Dec. 5, 2019 (AU) ................................ 2019904606

(51) Int. Cl.
*A61G 7/10* (2006.01)

(52) U.S. Cl.
CPC ......... *A61G 7/1078* (2013.01); *A61G 7/1051* (2013.01); *A61G 7/1061* (2013.01); *A61G 7/1063* (2013.01)

(58) Field of Classification Search
CPC .. A61G 7/1078; A61G 7/1051; A61G 7/1061; A61G 7/1063; A61G 7/1069;
(Continued)

(56) References Cited

U.S. PATENT DOCUMENTS

| | | | | |
|---|---|---|---|---|
| 805,758 A * | 11/1905 | Silva et al. | .......... | B23Q 1/0063 269/58 |
| 1,123,886 A * | 1/1915 | Kaszewski | ............ | E05B 37/025 70/330 |

(Continued)

FOREIGN PATENT DOCUMENTS

| | | |
|---|---|---|
| EP | 0376860 A1 | 7/1990 |
| WO | 2007113324 A2 | 10/2007 |

OTHER PUBLICATIONS

International Search Report & Written Opinion dated Jan. 25, 2021 from PCT Application No. PCT/AU2020/051314, 8 pages.

(Continued)

*Primary Examiner* — Justin C Mikowski
*Assistant Examiner* — Luke Hall
(74) *Attorney, Agent, or Firm* — INNOVATION CAPITAL LAW GROUP, LLP; Vic Lin

(57) ABSTRACT

A connection point assembly for a patient lifter spreader bar has a hook member defining a throat having a mouth, the mouth being formed between a distal end of the hook member and an adjacent base portion and a latch assembly operably coupled to the hook member at the mouth and comprising a latch configurable between an open position wherein the latch does not obstruct the mouth and a closed position wherein the latch obstructs the mouth. The connection point assembly comprises a visual indicator indicative of the open position and the closed position.

24 Claims, 6 Drawing Sheets

(58) Field of Classification Search
CPC .............. A61G 2205/20; A61G 7/1023; A61G 7/1015; F16B 45/023
USPC ......................... 5/85.1; 70/432, 330, 27, 307
See application file for complete search history.

(56) References Cited

U.S. PATENT DOCUMENTS

| | | | | | |
|---|---|---|---|---|---|
| 2,085,887 | A * | 7/1937 | Atkinson | G01D 11/28 | 362/23.15 |
| 2,117,442 | A * | 5/1938 | Mcweeny | H03J 1/045 | 116/247 |
| 2,199,264 | A * | 4/1940 | Lindstrom | B60Q 1/34 | 340/489 |
| 2,293,698 | A * | 8/1942 | Chaput | B60T 17/22 | 116/303 |
| 2,785,393 | A * | 3/1957 | Mininberg | G01P 1/11 | 340/441 |
| 2,847,526 | A * | 8/1958 | Pearce | B61L 19/14 | 74/548 |
| 2,920,930 | A * | 1/1960 | Joens | G01D 9/28 | 346/34 |
| 3,074,546 | A * | 1/1963 | Burgess | G03B 21/323 | 116/200 |
| 4,095,316 | A * | 6/1978 | Gabriel | F16B 45/026 | 242/615.3 |
| 4,134,658 | A * | 1/1979 | Suzuki | G03B 9/62 | 396/491 |
| 5,643,030 | A * | 7/1997 | Brown | B63C 9/24 | 116/277 |
| 5,735,025 | A * | 4/1998 | Bailey | F16B 45/028 | 24/600.1 |
| 5,864,929 | A * | 2/1999 | Sakong | F16B 45/023 | 24/600.1 |
| 6,067,927 | A * | 5/2000 | Johnson | G01F 23/205 | 116/284 |
| 6,279,971 | B1 * | 8/2001 | Dessenberger, Jr. | E05C 19/145 | 292/DIG. 31 |
| 6,363,589 | B1 * | 4/2002 | Calloway | F16B 45/026 | 24/600.1 |
| 6,547,798 | B1 * | 4/2003 | Yoon | A61F 2/2472 | 606/140 |
| 6,679,530 | B2 * | 1/2004 | Krynski | E05B 65/0007 | 292/210 |
| 6,877,345 | B1 * | 4/2005 | Misner | E05B 35/105 | 70/330 |
| 7,363,782 | B1 * | 4/2008 | Misner | E05B 35/105 | 70/284 |
| 7,654,593 | B2 * | 2/2010 | Hjort | F16B 45/031 | 294/82.19 |
| 8,281,430 | B1 * | 10/2012 | Hough | A61G 7/1051 | 5/89.1 |
| 8,631,544 | B1 * | 1/2014 | Shotey | F16B 2/10 | 24/19 |
| 8,955,203 | B2 * | 2/2015 | Tardif | F16B 45/026 | 24/599.5 |
| 9,289,634 | B2 * | 3/2016 | Chabod | A62B 1/14 | |
| 2003/0097737 | A1 * | 5/2003 | Gartsbeyn | F16B 45/023 | 24/599.7 |
| 2003/0200607 | A1 * | 10/2003 | Faucher | A61G 7/1074 | 5/81.1 R |
| 2004/0143945 | A1 * | 7/2004 | Christianson | F16B 45/023 | 24/600.1 |
| 2005/0193531 | A1 * | 9/2005 | Chang | F16B 45/023 | 24/600.2 |
| 2007/0051221 | A1 * | 3/2007 | Corcoran | B26F 1/40 | 83/628 |
| 2008/0005876 | A1 * | 1/2008 | Christianson | F16B 45/026 | 24/600.1 |
| 2008/0098774 | A1 * | 5/2008 | Huang | E05B 39/00 | 70/21 |
| 2008/0222859 | A1 * | 9/2008 | Chepurny | F16B 45/026 | 5/81.1 R |
| 2008/0295548 | A1 * | 12/2008 | Misner | E05B 37/025 | 70/432 |
| 2010/0031897 | A1 * | 2/2010 | Moeller | A01K 27/005 | 24/599.6 |
| 2011/0219538 | A1 * | 9/2011 | McWattie | A61G 7/1061 | 5/87.1 |
| 2011/0304163 | A1 * | 12/2011 | Liang | E05C 3/046 | 292/242 |
| 2012/0018689 | A1 * | 1/2012 | Chepurny | A61G 7/1015 | 254/342 |
| 2012/0317762 | A1 * | 12/2012 | Tardif | F16B 45/023 | 24/601.5 |
| 2013/0019401 | A1 * | 1/2013 | Faucher | A61G 7/1042 | 5/85.1 |
| 2013/0061392 | A1 * | 3/2013 | Zerhusen | A61G 7/1074 | 5/81.1 R |
| 2013/0086793 | A1 * | 4/2013 | Faucher | A61G 7/1034 | 403/376 |
| 2013/0298616 | A1 * | 11/2013 | Ullrich | E05B 47/0012 | 70/278.1 |
| 2013/0298619 | A1 * | 11/2013 | Ullrich | E05B 47/0012 | 70/283.1 |
| 2018/0171664 | A1 * | 6/2018 | Frommer | E05B 41/00 | |
| 2018/0255882 | A1 * | 9/2018 | Liggett | F16B 45/023 | |

OTHER PUBLICATIONS

International-type search report dated Oct. 7, 2020 from Australia Application No. 2019904606, 15 pages.

* cited by examiner

CONNECTION POINT ASSEMBLY FOR A PATIENT LIFTER SPREADER BAR WITH A VISUAL INDICATOR INDICATIVE OF A LATCH POSITION THEREOF

FIELD OF THE INVENTION

This invention relates generally to a connection point assembly for a patient lifter spreader bar and, more particularly, to a connection point assembly having a visual indicator indicative of a latch position thereof.

BACKGROUND OF THE INVENTION

Patient lifting apparatus of various configurations exist, but which generally comprise a hoist mechanism having a spreader bar at a distal end thereof. A patient harness sling is connected to the spreader bar to lift patients in use. Slings can also assist in partially bearing weight of a person for assisted standing.

The spreader bars similarly comprise various configurations but generally comprise at least two connection points at distal ends thereof to which sling straps are connected to hold the harness from the spreader bar.

Furthermore, certain spreader bar connection points of various configurations exist which are designed to reduce the likelihood of inadvertent detachment of a sling strap from the connection point in use.

Some configurations comprise an integrated upper spring latch extending substantially horizontally across the mouth of the connection point. However, if the sling strap loops over the bend of the connection point, it may lie across the latch and pull the latch open, thereby dropping the sling strap. Some connection point configurations have a hook doubling back sufficiently such that the latch extends across the mouth more vertically to reduce this likelihood.

Furthermore, connection points have various configuration of latches including those comprising a looped spring steel clip having legs of different lengths which engage the hook at offset points to bias the latch to a closed position.

However, these types of latches are difficult to use, including in requiring two-handed operation to release a sling strap wherein opposing forefingers of one hand are used to pull the latch open and the other hand used to pull the sling strap from the connection point.

It is been reported that, as a result of such inconvenience, staff often break these latches from the hook to avoid the inconvenience thereof but which renders the connection point potentially unsafe.

The present invention seeks to provide a connection point assembly for a patient lifter spreader bar, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a connection point assembly for a patient lifter spreader bar which comprises a hook member defining a throat having a mouth between a distal end and an adjacent portion thereof. The connection point assembly further comprises a latch assembly operably coupled to the hook member at the mouth.

The latch assembly is configurable between an open position where the latch does not obstruct the mouth and a closed position wherein the latch obstructs the mouth.

Furthermore, the connection point assembly comprises a visual indicator indicative of the open position and the closed position.

The latch assembly may comprise a base rotatably engaged to a distal end of the hook member at an axis. The distal end of the hook member may comprise bifurcations through which an axle pin is inserted through the base. The latch may extend tangentially from the base such that latch meets the base at such that a sling strap can pass into the throat but not from the throat.

The base may comprise a radially offset visual indicator which may have a first visual indication and a second radially offset visual indication such as of different colours. The base may comprise an arc aperture within which plastic pieces of different colours are inserted.

The distal end of the hook may comprise a reference point at which the radial offset of the base of the latch assembly is visually gauged to determine the latch position. In embodiments, the distal end of the hook comprises a window through which either of the first or second visual indication is visible depending on the position of the latch assembly.

For example, when the latch is safely closed, a green visual indication may collocate with the window and wherein the latch is unsafely open, a red visual indication a collocate with the window thereby providing a visual indication of the position of the latch assembly.

The distal end of the hook member may comprise windows on either side thereof such that the visual indication is apparent from either side of the connection point assembly.

The latch assembly may comprise a biasing member (such as a coiled spring) to bias the latch assembly to a closed position. The coiled spring may be concealed between bifurcations of the latch assembly to avoid tampering.

An edge of the base of the latch assembly may be accessible for manually opening the latch assembly. For example, an edge of the base substantially opposite the latch may comprise a tactical edge extending from between bifurcations of the distal end of the hook member such that the user may run a finger thereacross to open the latch assembly.

As such, when compared to prior art arrangement, the present connection point assembly enhances safe operation thereof by providing a visual indication of the position of the latch assembly.

Furthermore, in the embodiment wherein the distal end of the hook comprises bifurcations between which the base of the latch assembly is rotatably engaged and comprises a concealed coiled spring therebetween, when compared to prior art arrangements, the present connection point assembly prevents tampering with the latch assembly.

Furthermore, in the embodiment wherein the distal end of the comprises bifurcations between which the base of the latch assembly is rotatably engaged and exposes a tactical edge therebetween, the latch assembly may be opened, and a sling strap removed therefrom in a one-handed operation.

According to one aspect, there is provided a connection point assembly for a patient lifter spreader bar, the connection point assembly comprising a hook member defining a throat having a mouth, the mouth being formed between a distal end of the hook member and an adjacent base portion adjacent the distal end of the hook member, a latch assembly operably coupled to the hook member at the mouth, the latch assembly comprising a latch, the latch assembly configurable between an open position wherein the latch does not obstruct the mouth and a closed position wherein the latch obstructs the mouth, wherein the connection point assembly comprises a visual indicator indicative of the open position and the closed position, wherein the visual indicator comprises a first visual indication and a second radially offset visual indication and wherein the distal end of the hook member comprises a window and wherein the first visual indication is viewable through the window in the closed position and the second visual indication is viewable through the window in the open position.

The latch assembly may be rotatably engaged to the distal end of the hook member.

The latch may comprise a base from which the latch extends.

The distal end of the hook member may comprise bifurcations between which the base may be rotatably engaged by an axle pin.

The base may comprise a circular periphery.

The latch may comprise a base from which the latch extends and wherein the distal end of the hook member may comprise bifurcations between which the base may be rotatably engaged and wherein at least one of the bifurcations defines the window therethrough.

The visual indicator may be viewable from both sides of the base and wherein each bifurcation defines a respective window therethrough.

The window may comprise a notch formed through an edge of at least one of the bifurcations.

The first and second visual indication may be of different colour.

The base may comprise an arc aperture comprising first and second visual indicative pieces inserted therein adjacently.

The first and second visual indicative pieces may be plastic.

The latch may comprise a base from which the latch extends and wherein an edge of the base may be exposed for manually rotating the base to deflect the latch.

The distal end of the hook member may comprise bifurcations between which the base may be rotatably engaged and wherein the edge may be accessible between the bifurcations.

The edge may extend accessibly out from between the bifurcations.

The edge may comprise a tactile surface.

The latch may comprise a base from which the latch extends and wherein the latch extends tangentially from the base thereby defining an outer edge and an inner edge, the outer edge being more tangential with respect to the base than the inner edge and wherein the latch assembly may be connected to the distal end of the hook member in an orientation such that the outer edge faces out from the entrance and the inner edge faces the throat member and such that the latch hits the adjacent base portion at an angle in the closed position.

The base may be rotatably engaged to the distal end of the hook member about an axis and wherein the latch assembly may be orientated such that a distal end of the latch may be further towards the throat as compared to the axis.

The adjacent base portion may comprise an indentation to seat a distal end of the latch.

The indentation may comprise planar inner sides which meet respective outer planar size of the distal end of the latch to hinder sideways movement.

The connection point assembly may further comprise a biasing coiled spring concealed between the bifurcations and the base and wherein the coiled spring may be configured for biasing the latch to the closed position.

The biasing coiled spring may comprise a coil and a pair of radial arms extending therefrom.

A side surface of the base may comprise a coiled spring accommodation recess therein for accommodating the biasing coiled spring therein.

The hook member may comprise a shank, a bend and a bite and wherein the bite may comprise a length such that the distal end of the hook member locates closely adjacent the adjacent base portion.

A method of using the connection point assembly may comprise inspecting the visual indicator thereof to ascertain the position of the latch assembly.

The method may comprise pushing the edge with a finger to rotate the base to deflect the latch.

The method may further comprise removing a sling strap from the throat using a same hand.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
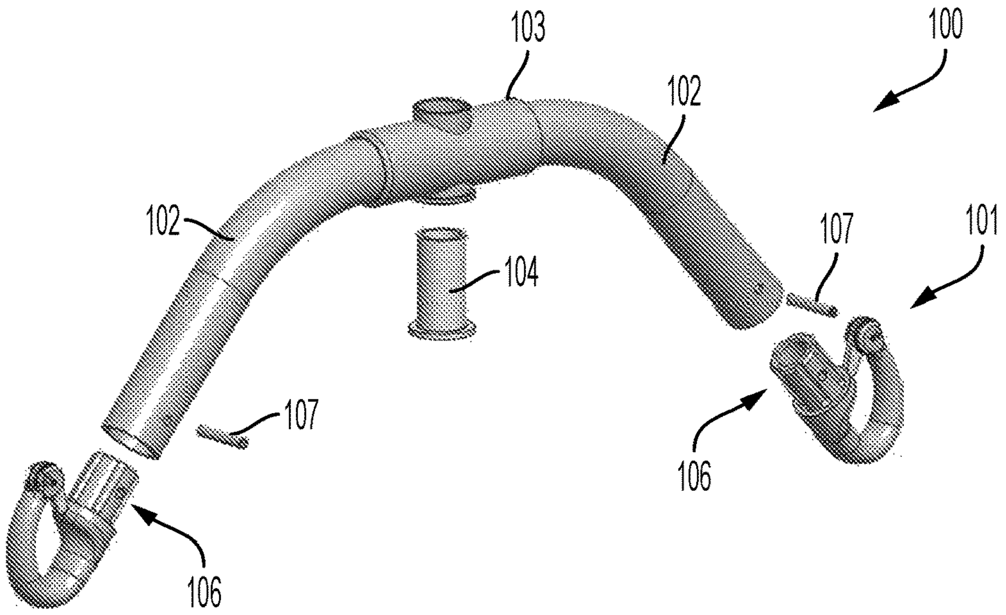
FIG. 1 shows a disassembled view of patient lifter spreader bar comprising a pair of connection point assemblies in accordance with an embodiment.
Figure 2:
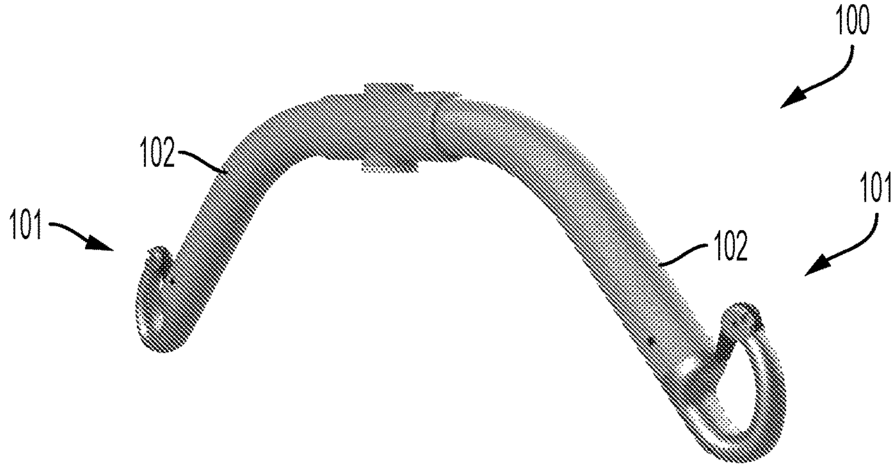
FIG. 2 shows an assembled view of the spreader bar.
Figure 3:
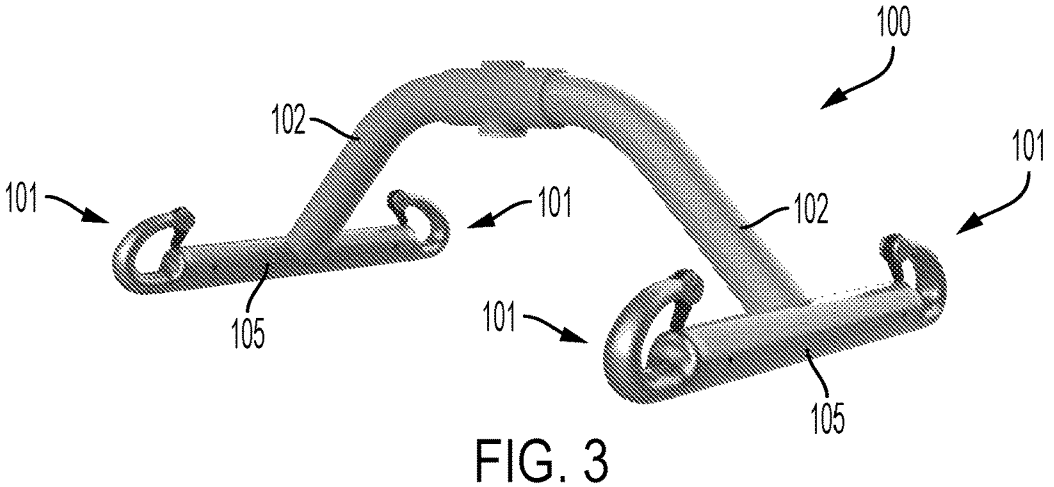
FIG. 3 shows an embodiment of a patient lifter spreader bar comprising four connection point assemblies thereon.

FIG. 1 shows a patient lifter spreader bar 100 comprising at least one connection point assembly 101. The embodiment of FIG. 2 shows a spreader bar 100 comprising two connection point assemblies 101 whereas the embodiment of FIG. 3 shows a spreader bar 100 comprising four connection point assemblies 101. Other configurations are possible.

The spreader bar 100 typically comprises spreader bars 102 extending from a centrepiece 103 which may comprise a pivot bushing 104 therethrough for pivotal attachment to patient lifter apparatus.

As is shown, the spreader bars 102 may extend substantially horizontally from the centrepiece 103 and curve downwardly towards distal ends thereof at approximately 45°.

In the embodiment of FIG. 3, transverse horizontal bars 105 may connect to respective distal ends of the spreader bars 102 at a centrepoint and extend horizontally either side thereof to connection point assemblies 101 at distal ends thereof.

The spreader bar 102 and the horizontal bar 105 may be cylindrical and the connection point assembly 101 may comprise an insertion portion 106 inserted within distal open ends thereof. The insertion portion 106 may be sized for tight frictional engagement within each respective distal open end may comprise longitudinal channels 107 therealong. A locking pin 107 may insert through collocating apertures of the spreader bar 102 or horizontal bar 105 and the insertion portion 106 to lock the connection point assembly 101 in place.

Figure 4:
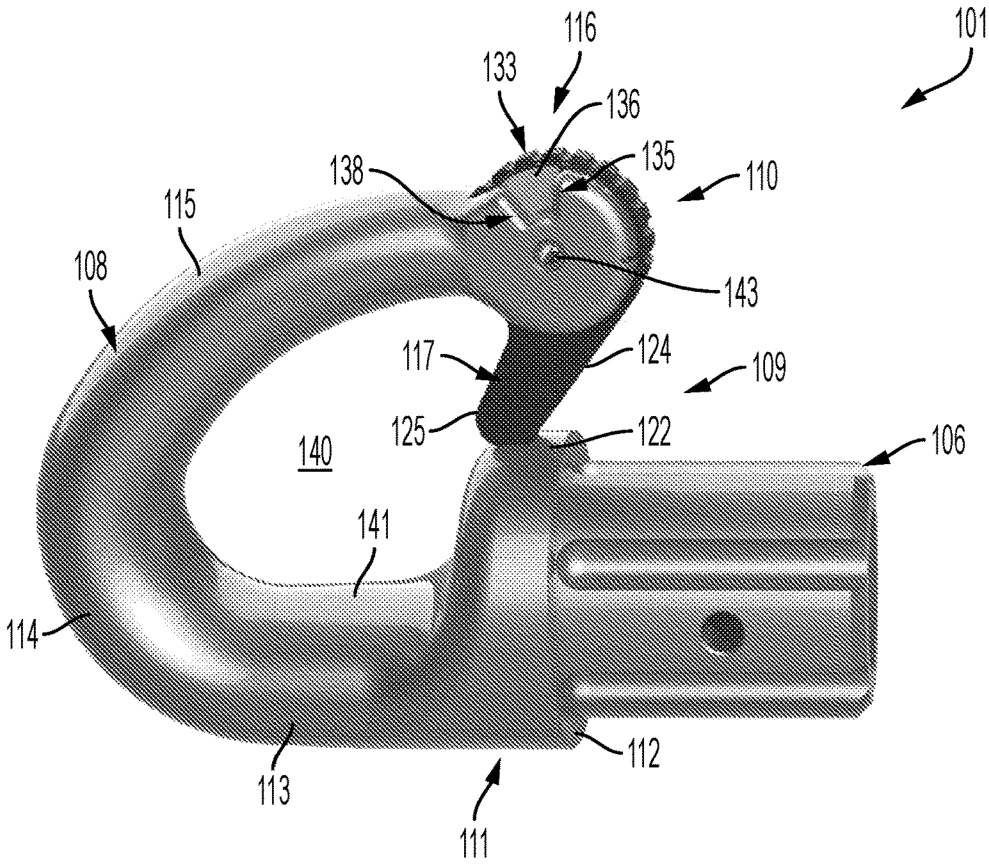
FIG. 4 shows a connection point assembly in a closed configuration in accordance an embodiment.
Figure 5:
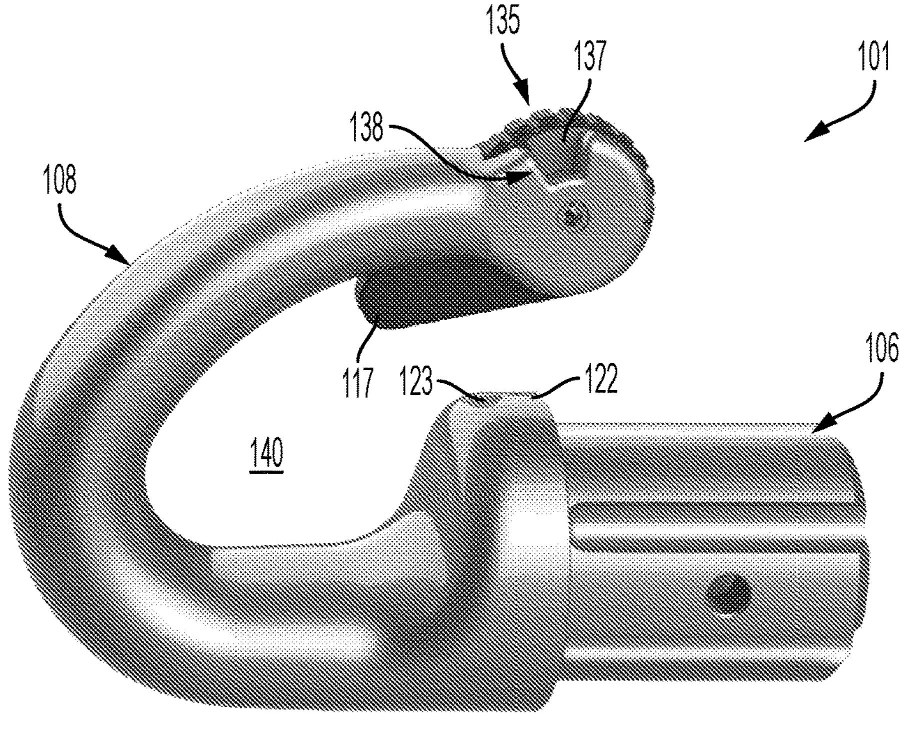
FIG. 5 shows the connection point assembly in an open configuration.

Referencing FIGS. 4 and 5, the assembly 101 comprises a hook member 108 defining a throat 140 having a mouth 109.

The hook member 108 may comprise a shank 113, a bend 114 and a bite 115. The bite 115 may double back the length of the shank 113 such that a distal end 110 thereof is closely adjacent an adjacent base portion 111 of the hook member 108 or the adjacent spreader bar 102. The base portion 111 may transition to the insertion portion 106 at a rim 112 such that adjacent surfaces of the base portion 111 and distal ends of the spreader bar 102 are continuous.

The base portion 111 may narrow to the shank 113 thereby widening the throat 140. The shank 130 may furthermore be non-coaxially aligned with a longitudinal axis of the insertion portion 106 and may define an inner straight bearing edge 141.

The connection point assembly 101 comprises a latch assembly 116 coupled to the hook member 108 at the mouth 109.

The latch assembly comprises a latch 117. The latch assembly 116 is configurable to position the latch 117 between an open position as is shown in FIG. 5 wherein the latch 117 does not obstruct the mouth 109 and a closed position as is shown in FIG. 4 wherein the latch 117 obstructs the mouth 119.

The latch assembly 116 may comprise a base 118 from which the latch 117 extends. The base 117 may be rotatably coupled to the distal end 110 of the hook member 108.

Figure 6:
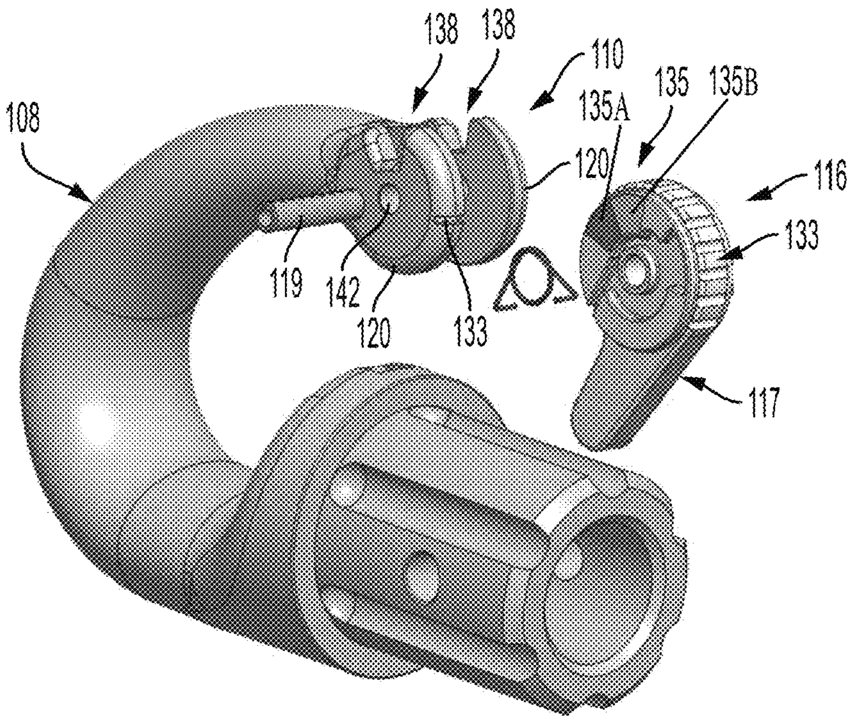
FIG. 6 shows a disassembled view of the connection point assembly in accordance with an embodiment.

With reference to FIG. 6, the distal end 110 of the hook member 108 may comprise bifurcations 120 having collocating apertures 142 through which an axle pin 119 is inserted through an axial aperture 121 of the base 118.

Figure 7:
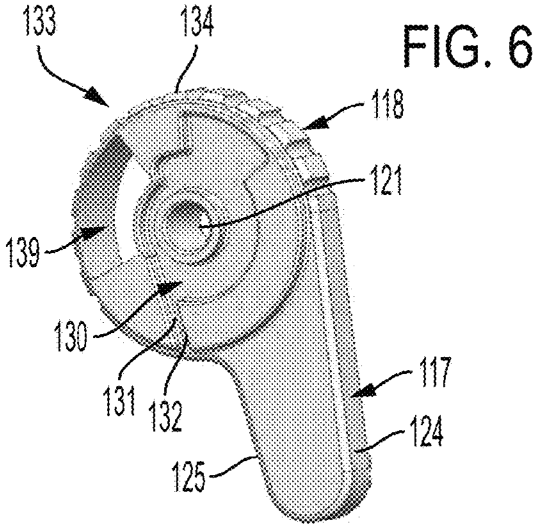
FIG. 7 shows a latch assembly of the connection point assembly in accordance with an embodiment.

In embodiment shown in FIG. 7, the base 118 is generally annular thereby defining a circular periphery portion.

The latch 117 may extend partially tangentially from the base in that a longitudinal axis of the latch 117 does not coincide with the axial aperture 121 of the base. In this embodiment, the latch 170 may define an outer edge 124 which may meet the edge of the base 118 tangentially to the inner edge 125 which meets the edge of the base 118 non-tangentially.

With reference to FIG. 4, in the closed position, a distal end of the latch 117 may hit an adjacent surface 122 of the base portion 111 at an angle. With reference to FIG. 5, the adjacent surface 122 may comprise an indentation 123 within which the distal end of the latch 117 is seated in the closed position. The indentation 123 may comprise inner planar edges which bear on respective outer and inner surfaces of the distal end of the latch 117 to prevent sideways movement.

The tangential latch 117 hitting the adjacent surface 122 at an angle may thereby arrest further movement thereof. Furthermore, the distal end of the latch 117 may be further towards the throat 140 as compared to the axis 143 of the latch member such that a sling strap may bear against the outer edge 124 of the latch 117 to deflect the latch 117 from the mouth 109 (that is, wherein the base 118 rotates clockwise given the orientation of FIG. 4) and, conversely, the sling strap cannot deflect the latch 117 (anticlockwise given the orientation of FIG. 4) when bearing against the inner edge 125 of the latch 117.

Figure 9:
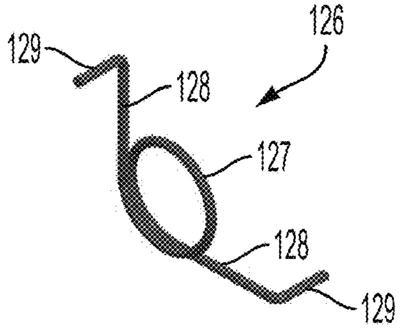
FIG. 9 shows a coiled biasing spring of the latch assembly in accordance with an embodiment.
Figure 10:
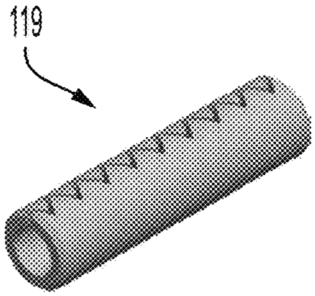
FIG. 10 shows an axle pin of the latch assembly in accordance with an embodiment.
Figure 11:
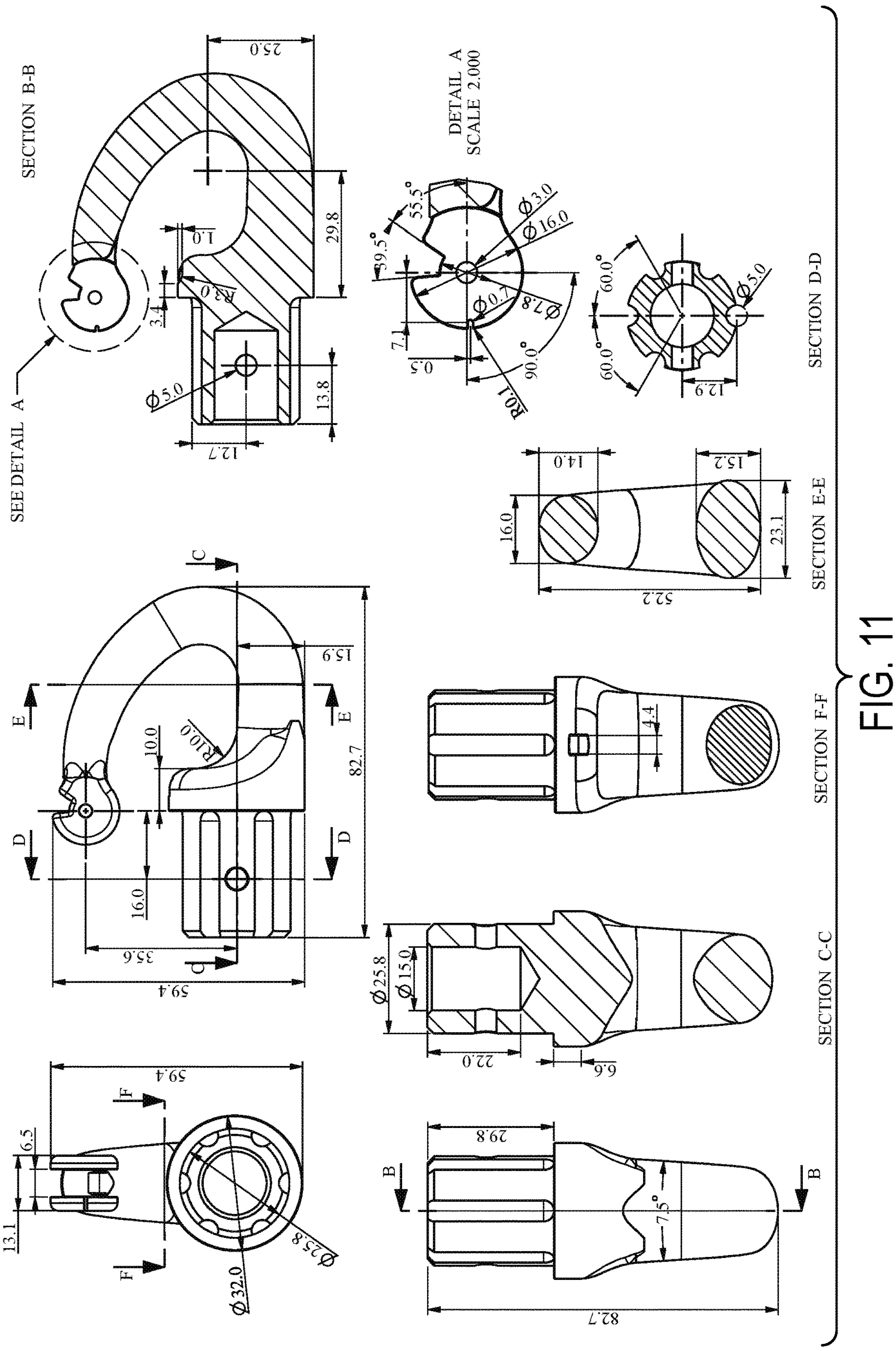
FIG. 11 gives indicative dimensions of the connection point assembly in accordance with an embodiment.
Figure 12:
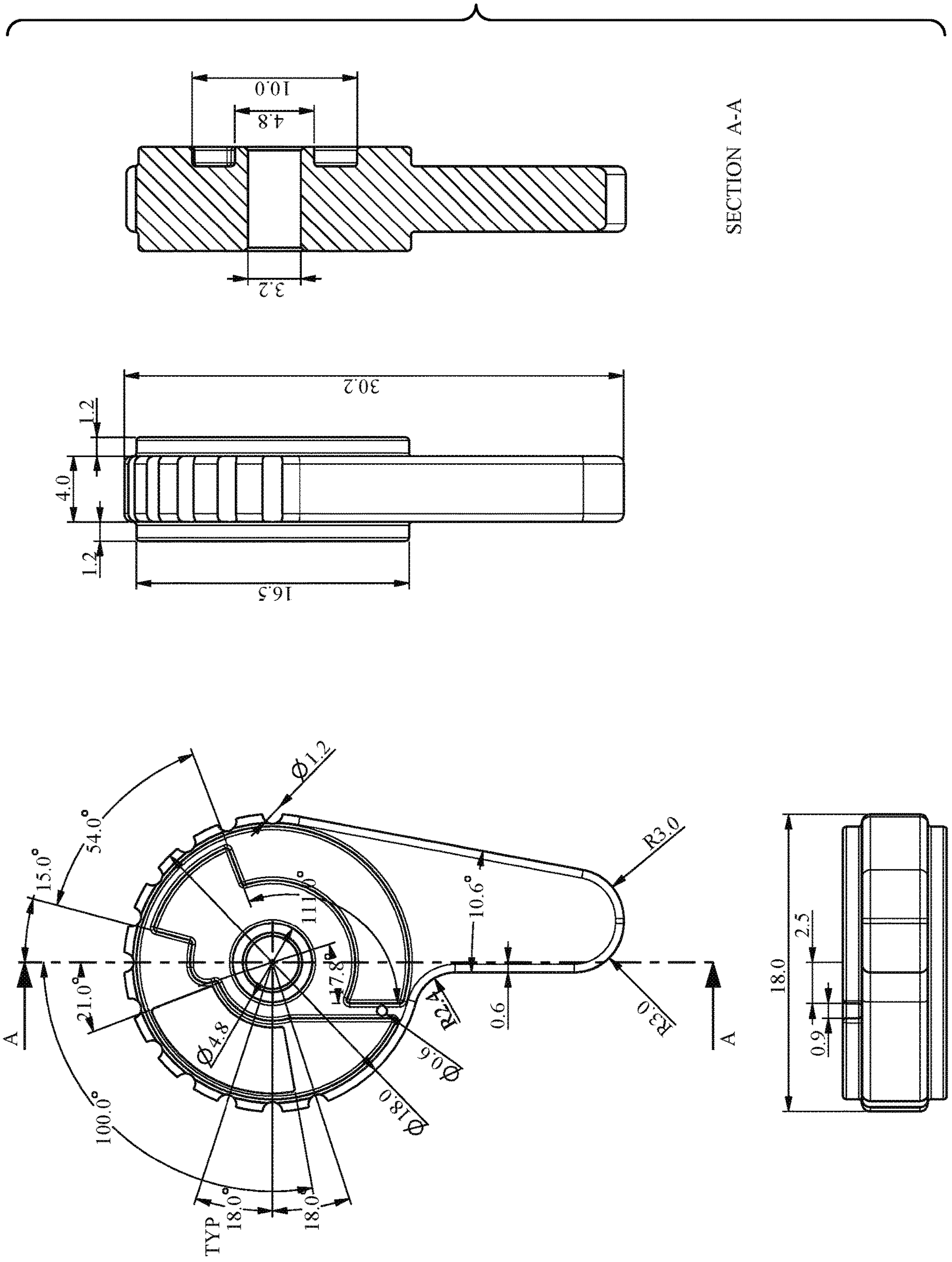
FIG. 12 gives indicative dimensions of the latch assembly in accordance with an embodiment.
Figure 13:
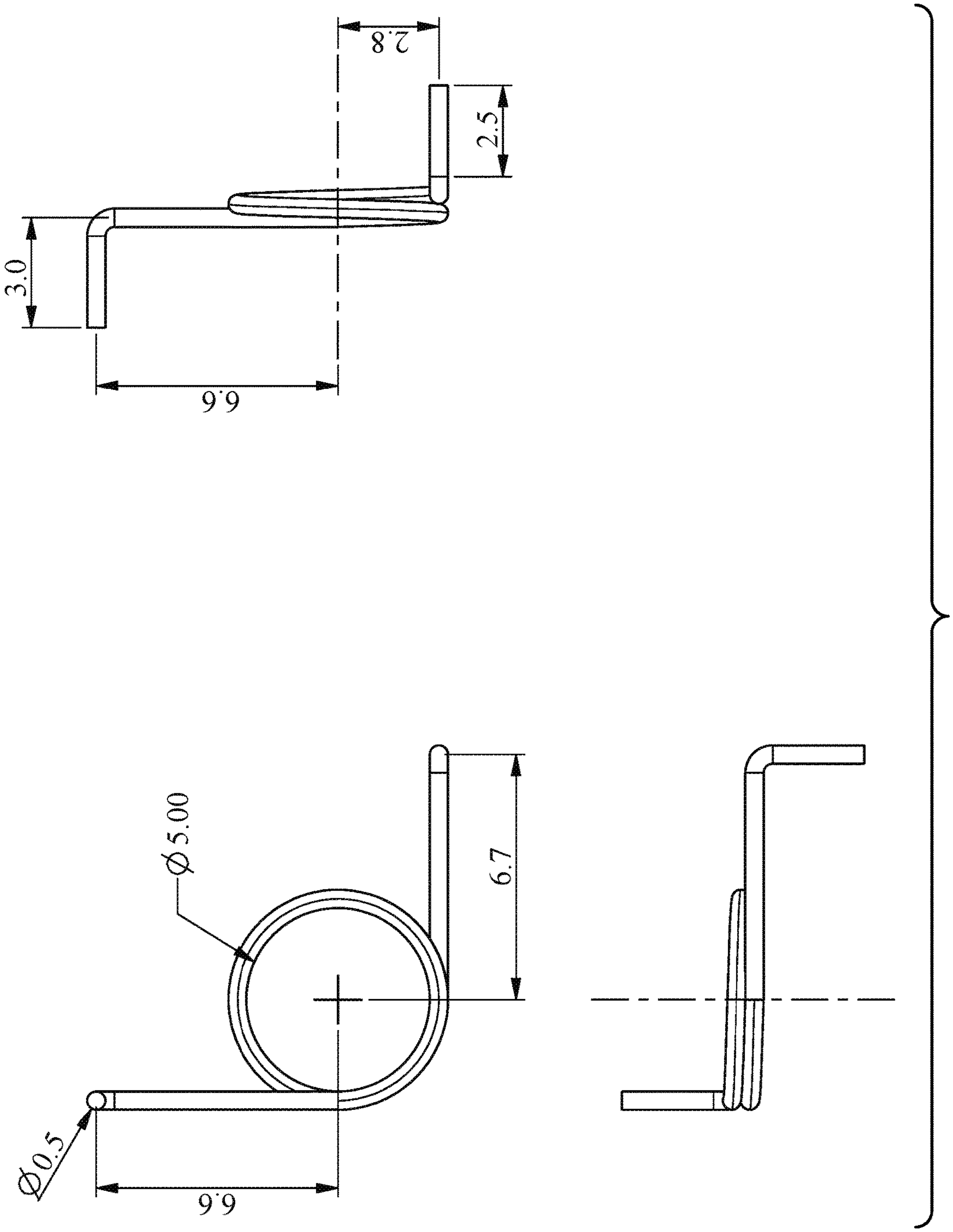
FIG. 13 shows indicative dimensions of the coiled biasing spring of the latch assembly in accordance with an embodiment.

The latch assembly 116 may be biased towards the closed position. With reference to FIG. 9, the latch assembly may comprise a biasing coiled spring 126 comprising a coil 127 from which radial arms 128 extend. Each radial arm 128 may comprise an insertion end 129.

With reference to FIG. 7, side surfaces of the base 118 may comprise a coiled spring accommodation recess 130 therein which may comprise a radial arm channel leading towards an aperture within which one of the insertion ends 129 inserts. With reference to FIG. 6, an edge of one of the bifurcations 120 may comprise a channel 133 for the other insertion end 129. As such, the radial arms 128 act oppositely under torsion of the coil 127 to bias the latch assembly 116 to the closed position is shown in FIG. 4.

A tactile edge 133 may be exposed between the bifurcations 120 generally opposite the position of the latch 117 which may comprise grip protrusions 134 thereon. As such, a user can slide a finger across the tactile edge 133 from left to right in the orientation of FIG. 4 to open the latch 117.

The connection point assembly 101 comprises a visual indicator indicative of the position of the latch 117.

With reference to FIG. 6, the latch assembly may comprise a radially offset indicator 135 comprising a first visual indication 135A and a second radially offset visual indication 135B. Furthermore, the distal end of the hook member 108 may comprise a window within which either of the first or second visual indications is visible depending on the position of the latch assembly 116.

Figure 8:
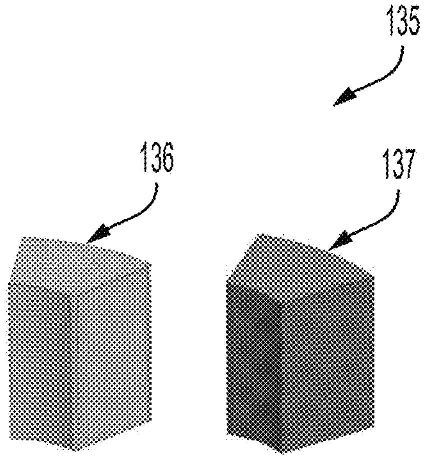
FIG. 8 shows pieces of a visual indicator of the latch assembly in accordance with an embodiment.

With reference to FIG. 8, the radially offset indicator 135 may comprise a first piece 136 and a second piece 137 which are inserted adjacently through an arc aperture 139 of the base 118 of the latch assembly 116. The first and second pieces 136, 137 may be of plastic and, for example, may comprise different colours, such as red and green. Additionally, or alternatively, the first and second pieces 136, 137 may comprise different wording such as "LOCKED" or "UNLOCKED".

One or both adjacent bifurcations 120 may comprise a window 138 across which the visual indicator 135 transitions as the base 118 rotates. The window 138 may take the form of a notch and an outer edge of the bifurcation 120.

As such, with reference to FIG. 4, in the closed position, the first piece 136 is adjacent the window 138 visually indicating that the latch 117 is in the closed position. For example, the first piece 136 may be green indicating that the latch 117 is safely closed.

However, when the latch 117 is in the open position as is shown in FIG. 5, the second piece 137 locates adjacent the window 138 so as to provide a visual indication that the latch 117 is open. For example, the second piece 137 may be red indicative of the latch being unsafely open.

The first and second visual indications may be visible from either side of the base 118 and the bifurcations 120 may each comprise a respective window 138 such that the visual indications of visible from both sides of the connection point assembly 101.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A connection point assembly for a patient lifter spreader bar, the connection point assembly comprising:

a hook member defining a throat having a mouth, the mouth being formed between a distal portion of the hook member and a base portion of the hook member, a latch assembly operably coupled to the hook member at the mouth, the latch assembly comprising a latch, the latch assembly configurable between an open position wherein the latch does not obstruct the mouth and a closed position wherein the latch obstructs the mouth, and a visual indicator indicative of the open position and the closed position, wherein the visual indicator comprises a first visual indication and a second angularly offset visual indication, wherein the latch assembly comprises a latch base from which the latch extends, wherein the distal portion of the hook member comprises bifurcations between which the latch base is rotatably engaged, wherein each bifurcation defines a respective window therethrough and wherein the first visual indication is viewable through each window in the closed position and the second visual indication is viewable through each window in the open position, such that the visual indicator is viewable from both sides of the latch base in a direction substantially parallel to the axis of rotation of the latch base.

2. A connection point assembly as claimed in claim 1, wherein the latch assembly is rotatably engaged to the distal portion of the hook member.

3. A connection point assembly as claimed in claim 2, wherein the latch base is rotatably engaged between the bifurcations by an axle pin.

4. A connection point assembly as claimed in claim 3, wherein the latch base comprises a circular periphery.

5. A connection point assembly as claimed in claim 1, wherein each window comprises a notch formed through respective edges of the bifurcations.

6. A connection point assembly as claimed in claim 1, wherein the first and second visual indications are of different colours.

7. A connection point assembly as claimed in claim 1, wherein the latch base comprises an arc aperture configured to secure the first and second visual indications and wherein first and second visual indications comprise pieces that are insertable adjacently into the arc aperture.

8. A connection point assembly as claimed in claim 7, wherein the first and second visual indicative pieces are plastic.

9. A connection point assembly as claimed in claim 1, wherein an edge of the latch base is exposed for manually rotating the latch base to deflect the latch.

10. A connection point assembly as claimed in claim 9, wherein the edge is accessible between the bifurcations.

11. A connection point assembly as claimed in claim 10, wherein the edge extends accessibly out from between the bifurcations.

12. A connection point assembly as claimed in claim 9, wherein the edge comprises a tactile surface.

13. A connection point assembly as claimed in claim 1, wherein the latch extends tangentially from the latch base thereby defining an outer edge and an inner edge, the outer edge being tangential with respect to the base and wherein the latch assembly is connected to the distal portion of the hook member in an orientation such that the outer edge faces out from the throat and the inner edge faces the throat and such that the latch hits the base portion at an angle in the closed position.

14. A connection point assembly as claimed in claim 13, wherein the latch base is rotatably engaged to the distal portion of the hook member about an axis and wherein the latch assembly is orientated such that a distal end of the latch is further towards the throat as compared to the axis.

15. A connection point assembly as claimed in claim 6, wherein the base portion comprises an indentation to seat a distal end of the latch.

16. A connection point assembly as claimed in claim 15, wherein the indentation comprises planar inner sides which meet respective outer planar sides of the distal end of the latch to hinder sideways movement.

17. A connection point assembly as claimed in claim 3, further comprising a biasing coiled spring concealed between the bifurcations and the latch base and wherein the coiled spring is configured for biasing the latch to the closed position.

18. A connection point assembly as claimed in claim 17, wherein the biasing coiled spring comprises a coil and a pair of radial arms extending therefrom.

19. A connection point assembly as claimed in claim 17, wherein a side surface of the latch base comprises a coiled spring accommodation recess therein for accommodating the biasing coiled spring therein.

20. A connection point assembly as claimed in claim 1, wherein the hook member comprises a shank, a bend and a bite and wherein the bite comprises a length such that the distal portion of the hook member locates closely adjacent the base portion.

21. A method of using a connection point assembly as claimed in claim 1, the method comprising inspecting the visual indicator thereof to ascertain the position of the latch assembly.

22. A method of using a connection point assembly as claimed in claim 9, the method comprising inspecting the visual indicator thereof to ascertain the position of the latch assembly, and pushing the edge with a finger to rotate the latch base to deflect the latch.

23. The method as claimed in claim 22, further comprising removing a sling strap from the throat using a same hand.

24. A connection point assembly as claimed in claim 9, wherein the tactile surface comprises grip protrusions.

* * * * *